US008970789B2

(12) United States Patent
Tokoro

(10) Patent No.: US 8,970,789 B2
(45) Date of Patent: Mar. 3, 2015

(54) RECEIVING APPARATUS AND CONTROL METHOD THEREOF

(75) Inventor: Takashi Tokoro, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 13/468,265

(22) Filed: May 10, 2012

(65) Prior Publication Data
US 2012/0218476 A1 Aug. 30, 2012

Related U.S. Application Data

(63) Continuation of application No. 12/575,096, filed on Oct. 7, 2009, now Pat. No. 8,199,258.

(30) Foreign Application Priority Data

Oct. 20, 2008 (JP) .................................. 2008-270290

(51) Int. Cl.
H04N 5/44 (2011.01)
H04N 5/268 (2006.01)
G06F 3/00 (2006.01)
H04N 5/765 (2006.01)
G09G 5/00 (2006.01)
G09G 5/12 (2006.01)
H04N 5/63 (2006.01)

(52) U.S. Cl.
CPC ............... *H04N 5/765* (2013.01); *G09G 5/006* (2013.01); *G09G 5/12* (2013.01); *G09G 2330/022* (2013.01); *G09G 2370/12* (2013.01); *H04N 5/63* (2013.01)
USPC ........... 348/705; 348/552; 348/553; 348/554; 348/706; 710/15; 710/16; 710/17

(58) Field of Classification Search
USPC ......... 348/552–560, 705, 706, 730, 723, 725; 710/15–17
See application file for complete search history.

(56) References Cited

U.S. PATENT DOCUMENTS

2008/0172504 A1* 7/2008 Kimura et al. .................. 710/63
2008/0271074 A1* 10/2008 Bae et al. ........................ 725/38
2008/0281995 A1* 11/2008 Bae et al. ........................ 710/16
2009/0219445 A1 9/2009 Kamida

FOREIGN PATENT DOCUMENTS

JP 2009-211163 A 9/2009

OTHER PUBLICATIONS

High-Definition Multimedia Interface Specification Version 1.3a, Nov. 10, 2006, p. 50-51.
The above reference was cited in a Jun. 18, 2013 Japanese Refusal, which is enclosed without an English Translation, that issued in Japanese Patent Application No. 2008-270290.
Oct. 29, 2012 Japanese Office Action, issued in Japanese Patent Application No. 2008-270290.

* cited by examiner

Primary Examiner — Michael Lee
(74) Attorney, Agent, or Firm — Cowan, Liebowitz & Latman, P.C.

(57) ABSTRACT

There is provided a receiving apparatus. The receiving apparatus comprises, among other things, a transmitting unit that transmits a power-on command that instructs the transmitting apparatus detected by the detecting unit to turn on power when there is no connecting unit whose status signal has been changed from "unable" to "able" as a result of the determination made by the determining unit, the transmitting unit causing the determining unit to perform the determination again after transmitting the power-on command, and a control unit that, when there is a connecting unit whose status signal has been changed from "unable" to "able" as a result of the determination made by the determining unit, controls the selecting unit so as to select the connecting unit.

18 Claims, 9 Drawing Sheets

MANAGEMENT TABLE 1

| LOGICAL ADDRESS | LOGICAL ADDRESS ADDITION FLAG | PHYSICAL ADDRESS | POWER-ON COMMAND TRANSMISSION FLAG |
|---|---|---|---|
| 1 | EXISTING | 1.0.0.0 | UNTRANSMITTED |
| 2 | ADDED | 2.0.0.0 | TRANSMITTED |

MANAGEMENT TABLE 2

| PORT NUMBER | 5VPWR STATUS | 5VPWR ADDITION FLAG |
|---|---|---|
| 1 | ON | EXISTING |
| 2 | ON | ADDED |

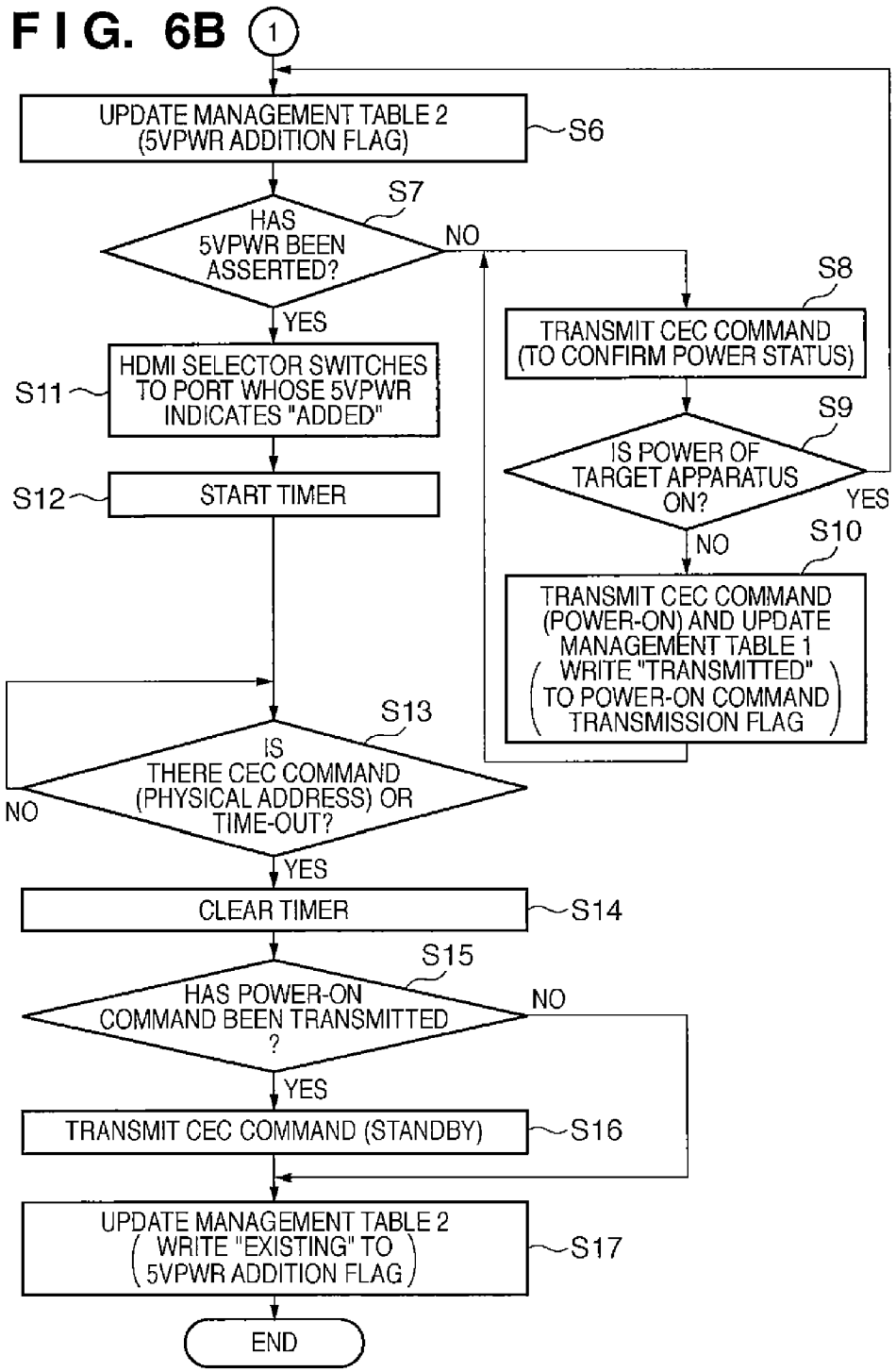

FIG. 8

MANAGEMENT TABLE 1

| LOGICAL ADDRESS | LOGICAL ADDRESS ADDITION FLAG | PHYSICAL ADDRESS | POWER-ON COMMAND TRANSMISSION FLAG |
|---|---|---|---|
| 1 | EXISTING | 1.0.0.0 | UNTRANSMITTED |
| 2 | ADDED | 2.0.0.0 | TRANSMITTED |
| NUMBER OF ADDED APPARATUSES + 1 | | | 2 |

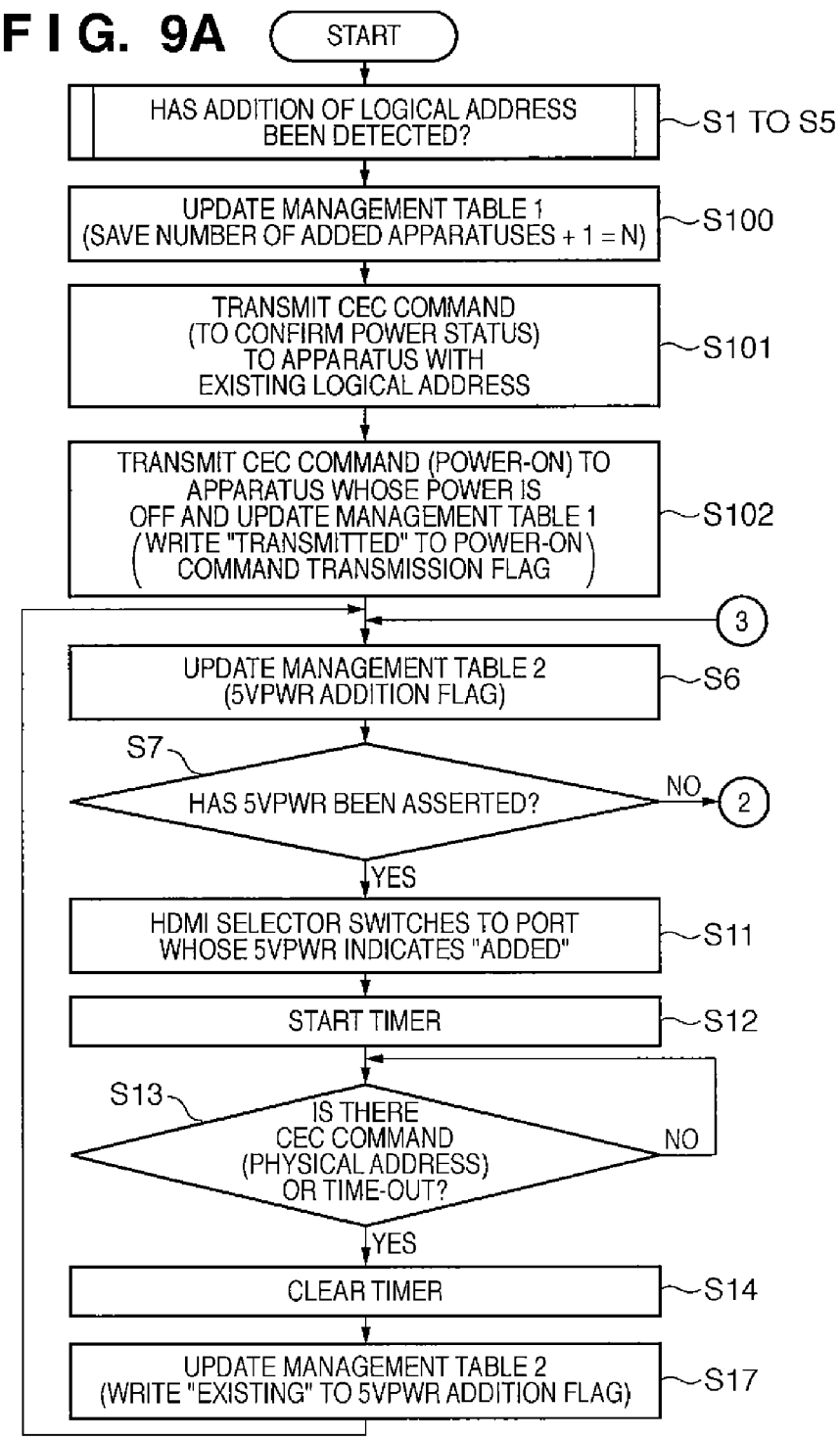

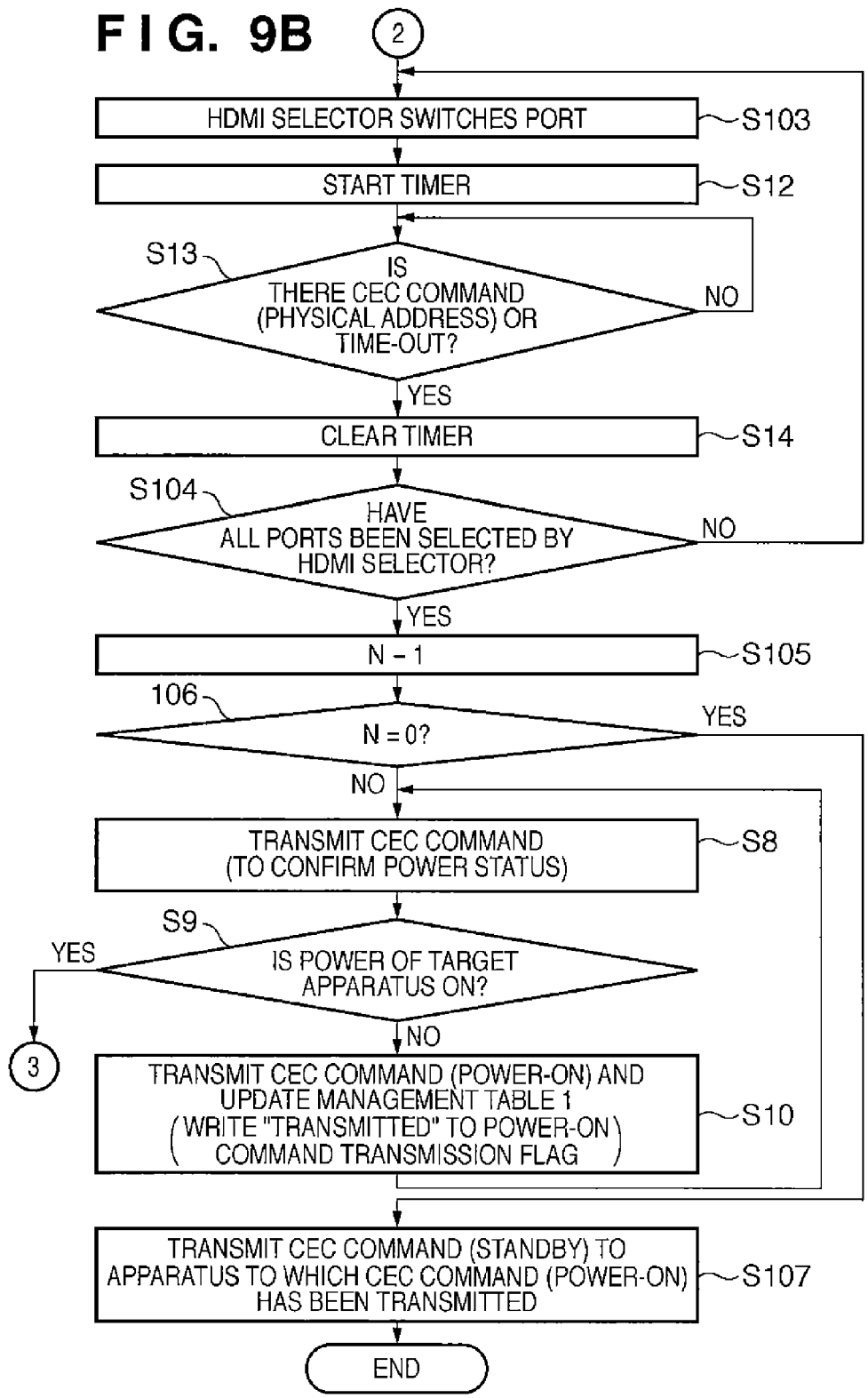

RECEIVING APPARATUS AND CONTROL METHOD THEREOF

CROSS-REFERENCE TO RELATED APPLICATION

This application is a continuation of application Ser. No. 12/575,096, filed Oct. 7, 2009, the entire disclosure of which is hereby incorporated by reference.

BACKGROUND OF THE INVENTION

1. Field of the Invention

The present invention relates to a receiving apparatus and a method for controlling the same.

2. Description of the Related Art

Due to advancements in liquid crystal panel manufacturing techniques in recent years, progress has been made towards a higher definition display screen for a television receiver. Along with this progress, the size of video data and audio data transmitted from an external apparatus, such as an HDD recorder, to a television receiver is increasing as well. In order to transmit large size data, an interface called an HDMI (High Definition Multimedia Interface) is often used (High-Definition Multimedia Interface Specification Version 1.3a). Television receivers equipped with a plurality of HDMI ports are also becoming widely used. HDMI is advantageous in that a complicated task of connecting a plurality of cables is eliminated because HDMI allows the transmission of video data and audio data with a single cable.

HDMI has a communication line called a CEC (Consumer Electronics Control) line. With the CEC, a receiving apparatus (e.g., a television receiver) and a transmitting apparatus (e.g., an HDD recorder) can be operated in conjunction with each other. For example, the receiving apparatus, when triggered by the power being turned off, transmits a Standby command to the transmitting apparatus, as a result of which, the power of the transmitting apparatus can be turned off as well. Likewise, the transmitting apparatus, when triggered by the start of playback, transmits an ImageViewOn command or TextViewOn command to the receiving apparatus, as a result of which, the power of the receiving apparatus is turned on. Then, the transmitting apparatus transmits an ActiveSource command to the receiving apparatus, and the receiving apparatus switches to an HDMI port serving as a data input source in accordance with the physical address stored in the command.

Such CEC communication becomes possible after the transmitting apparatus has obtained a physical address and a logical address. The transmitting apparatus obtains a physical address by reading an EDID (Extended Display Identification Data) ROM of the receiving apparatus by means of a DDC (Display Data Channel) line when an HPD (Hot Plug Detect) line of the receiving apparatus is enabled. Also, the transmitting apparatus obtains a logical address by sending a request to a logical address that the transmitting apparatus wants to obtain with a CEC command, and thereby confirming that the logical address is not in use.

However, some transmitting apparatuses cannot obtain a physical address and a logical address until after HDCP (High-bandwidth Digital Content Protection) authentication using a DDC line is completed after the EDID reading process ends.

On the other hand, the receiving apparatus, even when including a plurality of HDMI ports, generally performs HDCP authentication only with the apparatus that is connected to the HDMI port selected by the user. Consequently, the receiving apparatus enables only the HPD line of the port with which HDCP authentication is performed with the transmitting apparatus. Accordingly, if the transmitting apparatus clears the physical address and the logical address each time an HPD line is disabled, it cannot perform CEC communication.

Under the circumstances, Japanese Patent Laid-Open No. 2007-202115 discloses a technique for continuing CEC communication regardless of whether or not an HPD line is enabled. According to Japanese Patent Laid-Open No. 2007-202115, even when an HPD line is disabled, the transmitting apparatus continues CEC communication by using a physical address and a logical address that the transmitting apparatus has previously obtained and stored.

However, according to Japanese Patent Laid-Open No. 2007-202115, if the transmitting apparatus is connected, by the user, to an HDMI port whose HPD line is disabled or with which HDCP authentication is not possible, the transmitting apparatus continuously stores the previously obtained physical address and logical address. When the user then presses a playback button of the transmitting apparatus, the receiving apparatus cannot switch to the correct port that serves as a data input source because the physical address included in the ActiveSource command is a previously obtained value (that is, a value that does not correctly reflect the current connection status).

SUMMARY OF THE INVENTION

The present invention has been conceived in view of the above circumstances, and it is a feature of the present invention to provide a technique to reduce the possibility that a transmitting apparatus connected to a receiving apparatus stores an incorrect address.

According to an aspect of the present invention, there is provided a receiving apparatus comprising: a plurality of connecting units that connect a plurality of transmitting apparatuses that transmit at least one of video data and audio data to the receiving apparatus directly or via a repeater; a selecting unit that selects one of the plurality of connecting units; an authentication information storing unit that is accessible from a transmitting apparatus connected to a connecting unit selected by the selecting unit and that stores authentication information necessary for the transmitting apparatus to transmit at least one of video data and audio data to the receiving apparatus; a detecting unit that detects that a transmitting apparatus has been connected to at least one of the plurality of connecting units; a determining unit that, when the detecting unit has detected a connection with a transmitting apparatus, for each of the plurality of connecting units, determines whether or not a status signal that indicates whether or not it is possible for a transmitting apparatus connected to the connecting unit if the connecting unit is selected by the selecting unit to obtain the authentication information and that is input from the connecting unit has been changed from "unable" to "able"; a transmitting unit that transmits a power-on command that instructs the transmitting apparatus detected by the detecting unit to turn on power when there is no connecting unit whose status signal has been changed from "unable" to "able" as a result of the determination made by the determining unit, the transmitting unit causing the determining unit to perform the determination again after transmitting the power-on command; and a control unit that, when there is a connecting unit whose status signal has been changed from "unable" to "able" as a result of the determination made by the determining unit, controls the selecting unit so as to select the connecting unit.

According to another aspect of the present invention, there is provided a method for controlling a receiving apparatus, the receiving apparatus comprising: a plurality of connecting units that connect a plurality of transmitting apparatuses that transmit at least one of video data and audio data to the receiving apparatus directly or via a repeater; a selecting unit that selects one of the plurality of connecting units; and an authentication information storing unit that is accessible from a transmitting apparatus connected to a connecting unit selected by the selecting unit and that stores authentication information necessary for the transmitting apparatus to transmit at least one of video data and audio data to the receiving apparatus; the control method comprising: a detecting step of detecting that a transmitting apparatus has been connected to at least one of the plurality of connecting units; a determining step of, when a connection with a transmitting apparatus has been detected in the detecting step, for each of the plurality of connecting units, determining whether or not a status signal that indicates whether or not it is possible for a transmitting apparatus connected to the connecting unit if the connecting unit is selected by the selecting unit to obtain the authentication information and that is input from the connecting unit has been changed from "unable" to "able"; a transmitting step of transmitting a power-on command that instructs the transmitting apparatus detected in the detecting step to turn on power when there is no connecting unit whose status signal has been changed from "unable" to "able" as a result of the determination made in the determining step, the transmitting step causing the determining step to perform the determination again after transmitting the power-on command; and a control step of, when there is a connecting unit whose status signal has been changed from "unable" to "able" as a result of the determination made in the determining step, controlling the selecting unit so as to select the connecting unit.

With the above configuration according to the present invention, it becomes possible to reduce the possibility that a transmitting apparatus connected to a receiving apparatus stores an incorrect address.

Further features of the present invention will become apparent from the following description of exemplary embodiments with reference to the attached drawings.

BRIEF DESCRIPTION OF THE DRAWINGS

FIGS. 6A and 6B are flowcharts showing a process for causing a transmitting apparatus to obtain an address performed by the receiving apparatus 100 according to the first embodiment.

FIG. 8 is a diagram showing Management Table 1 according to the second embodiment.

FIGS. 9A and 9B are flowcharts showing a process for causing a transmitting apparatus to obtain an address performed by the receiving apparatus 100 according to the second embodiment.

DESCRIPTION OF THE EMBODIMENTS

Preferred embodiments of the present invention will now be described with reference to the attached drawings. Each embodiment described below will be helpful in understanding a variety of concepts from the generic to the more specific.

It should be noted that the technical scope of the present invention is defined by the claims, and is not limited by each embodiment described below. In addition, not all combinations of the features described in the embodiments are necessarily required for realizing the present invention.

First Embodiment

Figure 1:
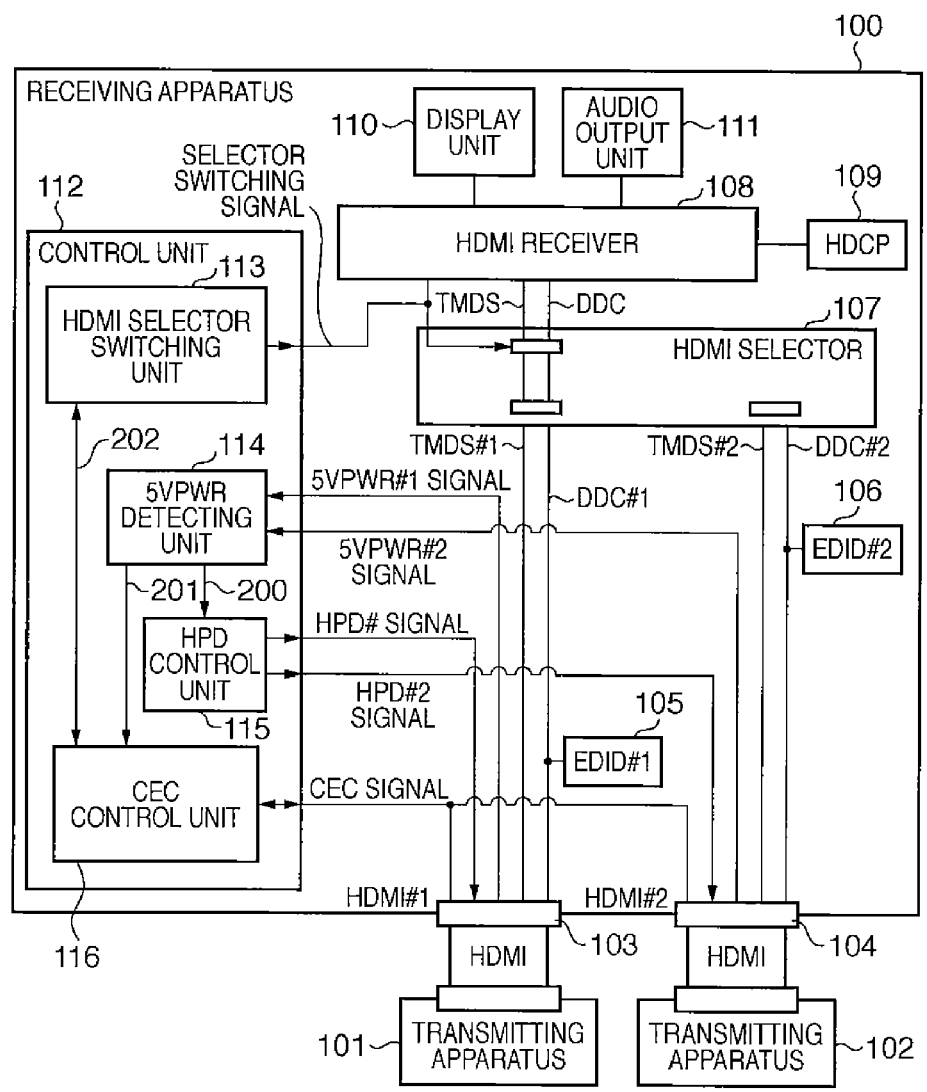
FIG. 1 is a block diagram showing a configuration of a receiving apparatus 100 according to a first embodiment.

FIG. 1 is a block diagram showing a configuration of a receiving apparatus 100 according to a first embodiment. The receiving apparatus 100 can be, for example, a television receiver, but it may be any apparatus as long as it can operate as an HDMI (High Definition Multimedia Interface) sink.

The receiving apparatus 100 includes two HDMI ports (an HDMI port 103 and an HDMI port 104) to which a transmitting apparatus 101 and a transmitting apparatus 102 are respectively connected with an HDMI interface. The transmitting apparatus 101 and the transmitting apparatus 102 can be, for example, HDD recorders, but they can be any apparatuses as long as they are capable of operating as an HDMI source and transmitting at least one of video data and audio data to the receiving apparatus 100. The receiving apparatus 100 may include more than two HDMI ports.

The receiving apparatus 100 also includes an HDCP ROM 109 (authentication information storing means) in which authentication information used for HDCP (High-bandwidth Digital Content Protection) authentication is stored.

The receiving apparatus 100 also includes an HDMI receiver 108 that receives data and an HDMI selector 107 that selects either one of the HDMI port 103 and the HDMI port 104 as a port from which data is input into the HDMI receiver 108. The HDCP ROM 109 is accessible from the transmitting apparatus connected to an HDMI port selected by the HDMI selector 107. However, there is a transmitting apparatus that is configured such that it cannot obtain authentication information from the HDCP ROM 109 when the power is off even when it is connected to the HDMI port selected by the HDMI selector 107.

The receiving apparatus 100 also includes a display unit 110 that displays images of the video data received by the HDMI receiver 108, and an audio output unit 111 that outputs the sound of the audio data. However, the receiving apparatus 100 does not necessarily include the display unit 110 and the audio output unit 111.

The receiving apparatus 100 also includes EDID ROMs 105 and 106 in which various information on the receiving apparatus 100 (the resolution of the display unit 110, a physical address to be assigned to a transmitting apparatus connected to each HDMI port, and so on) is written, and they are connected to the HDMI port 103 and 104, respectively. For example, a physical address to be assigned to a transmitting apparatus connected to the HDMI port 103 is "1.0.0.0", and a physical address to be assigned to a transmitting apparatus connected to the HDMI port 104 is "2.0.0.0".

The receiving apparatus 100 also includes a control unit 112 that operates a connected transmitting apparatus so as to obtain a correct address (the details of operation will be described later). The control unit 112 includes an HDMI selector switching unit 113 that controls the switching of the HDMI selector 107 by transmitting a selector switching signal to the HDMI selector 107. The control unit 112 also includes a 5VPWR detecting unit 114, an HPD control unit 115 and a CEC control unit 116, each of which is connected to the HDMI ports 103 and 104. The HPD control unit 115 activates the HPD signal of the HDMI port selected by the HDMI selector 107, as a result of which, the transmitting apparatus connected to the selected HDMI port can perform HDCP authentication.

However, as mentioned above, there is a transmitting apparatus configured such that it cannot obtain authentication information from the HDCP ROM 109 when the power is off. The control unit 112 can find out whether or not the transmitting apparatuses respectively connected to the HDMI ports 103 and 104 can obtain authentication information by checking a signal (status signal) input into the 5VPWR detecting unit 114. For example, when the power of the transmitting apparatus 101 is on, or when the transmitting apparatus 101 is configured such that it can obtain authentication information even when the power is off, a status signal indicating "able" is input from the HDMI port 103 to the 5VPWR detecting unit 114.

A signal line 200 represents a connection between the 5VPWR detecting unit 114 and the HPD control unit 115, a signal line 201 represents a connection between the 5VPWR detecting unit 114 and the CEC control unit 116, and a signal line 202 represents a connection between the HDMI selector switching unit 113 and the CEC control unit 116.

Figure 2:
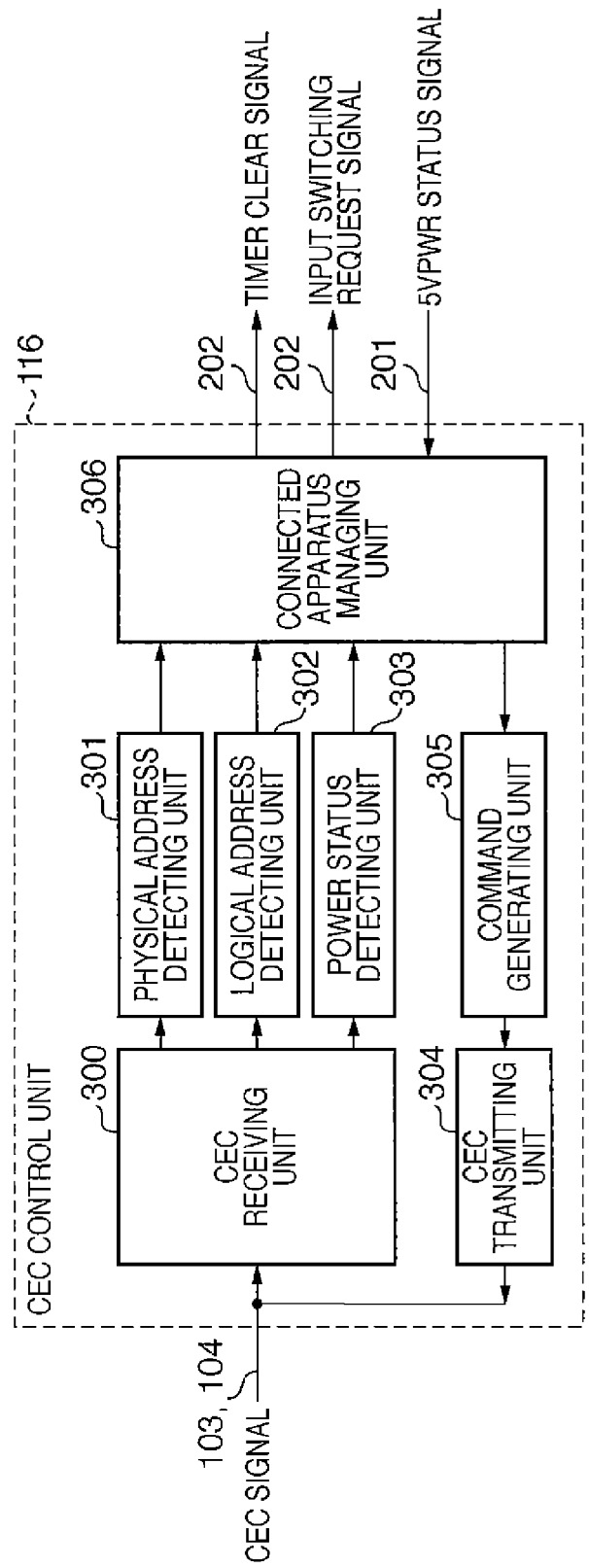
FIG. 2 is a block diagram showing a configuration of a CEC control unit 116.

A configuration of the CEC control unit 116 will be described next with reference to FIG. 2.

The CEC control unit 116 includes a CEC receiving unit 300 that receives CEC signals (CEC commands) and a CEC transmitting unit 304 that transmits CEC signals. The CEC control unit 116 also includes a physical address detecting unit 301 that receives a Report_Physical_Address command and detects a physical address that corresponds to the logical address indicated by the received command. The CEC control unit 116 also includes a logical address detecting unit 302 that detects the ACK bit of a Ping command and detects a connection with the transmitting apparatus that has the logical address indicated by the Ping command. The CEC control unit 116 also includes a power status detecting unit 303 that receives a Report_Power_Status command and detects the power status of the transmitting apparatus that has the logical address indicated by the command. The CEC control unit 116 also includes a command generating unit 305 that generates CEC commands (a power-on command, a power-off command, a connection confirmation command, and so on) and a connected apparatus managing unit 306 that manages the status of a transmitting apparatus connected to the receiving apparatus 100.

The CEC receiving unit 300 is connected to the physical address detecting unit 301, the logical address detecting unit 302 and the power status detecting unit 303, and interprets a command received from a transmitting apparatus and transfers the command to an appropriate detecting unit. The physical address detecting unit 301, the logical address detecting unit 302 and the power status detecting unit 303 are connected to the connected apparatus managing unit 306 so that they can notify the connected apparatus managing unit 306 of the content of the detected command.

Figures 3, 4, 5:
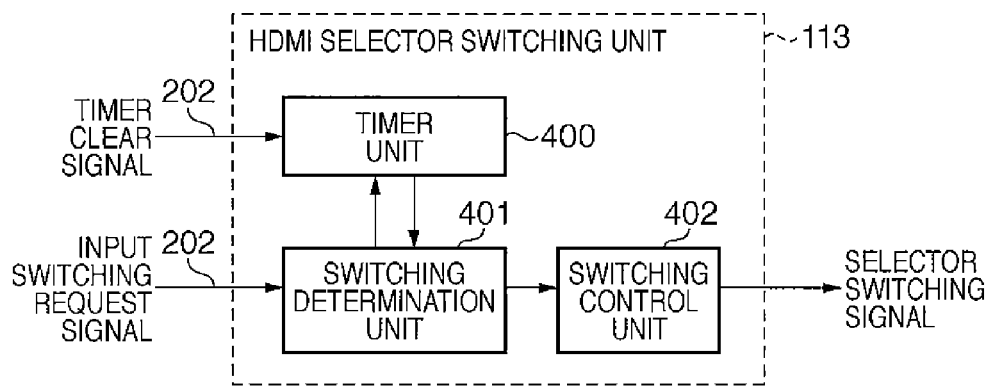
FIG. 3 is a diagram showing Management Table 1 stored in a connected apparatus managing unit 306.
FIG. 4 is a diagram showing Management Table 2 stored in the connected apparatus managing unit 306.
FIG. 5 is a block diagram showing a configuration of an HDMI selector switching unit 113.

The connected apparatus managing unit 306 stores Management Table 1 shown in FIG. 3 and Management Table 2 shown in FIG. 4. The Management Table 1 includes the following columns: "Logical Address", "Logical Address Addition Flag", "Physical Address" and "Power-on Command Transmission Flag". The Management Table 2 includes the following columns: "Port Number" "5VPWR Status" and "5VPWR Addition Flag".

"Logical Address" of the Management Table 1 shows the logical addresses of transmitting apparatuses connected to the receiving apparatus 100, and "Logical Address Addition Flag" indicates whether the transmitting apparatus of each logical address is a newly added one or an existing one. "Physical Address" shows the physical address of the transmitting apparatus that corresponds to each logical address, and "Power-on Command Transmission Flag" indicates whether or not a power-on command has been transmitted to the transmitting apparatus of each logical address. Accordingly, the connected apparatus managing unit 306 also functions as an apparatus information storing unit as it has the "Power-on Command Transmission Flag" information of the Management Table 1.

The "5VPWR Status" of the Management Table 2 indicates the 5VPWR status of the transmitting apparatus connected to each HDMI port of the receiving apparatus 100, and "5VPWR Addition Flag" indicates whether or not 5VPWR has been added to each HDMI port.

The connected apparatus managing unit 306 is also connected to the 5VPWR detecting unit 114 so as to update the "5VPWR Status" (see FIG. 1). The connected apparatus managing unit 306 is also connected to the command generating unit 305 so as to generate a CEC command and transmit the command. The command generating unit 305 is connected to the CEC transmitting unit 304, and the CEC transmitting unit 304 is connected to the HDMI ports 103 and 104.

A configuration of the HDMI selector switching unit 113 will be described with reference to FIG. 5.

The HDMI selector switching unit 113 includes a timer unit 400 that measures time, a switching determination unit 401 that determines which HDMI port to select as an input source based on the 5VPWR status, and a switching control unit 402 that switches the HDMI selector 107. The timer unit 400 is connected to the connected apparatus managing unit 306, and receives a timer clear signal from the connected apparatus managing unit 306. The switching determination unit 401 is connected to the connected apparatus managing unit 306, and receives an input switching request signal from the connected apparatus managing unit 306. The switching determination unit 401 is also connected to the timer unit 400, and transmits a timer start request signal to the timer unit 400 as well as receives a time-out signal from the timer unit 400. The switching control unit 402 is connected to the HDMI selector 107, and transmits an HDMI selector switching signal to the HDMI selector 107.

Figure 6A:
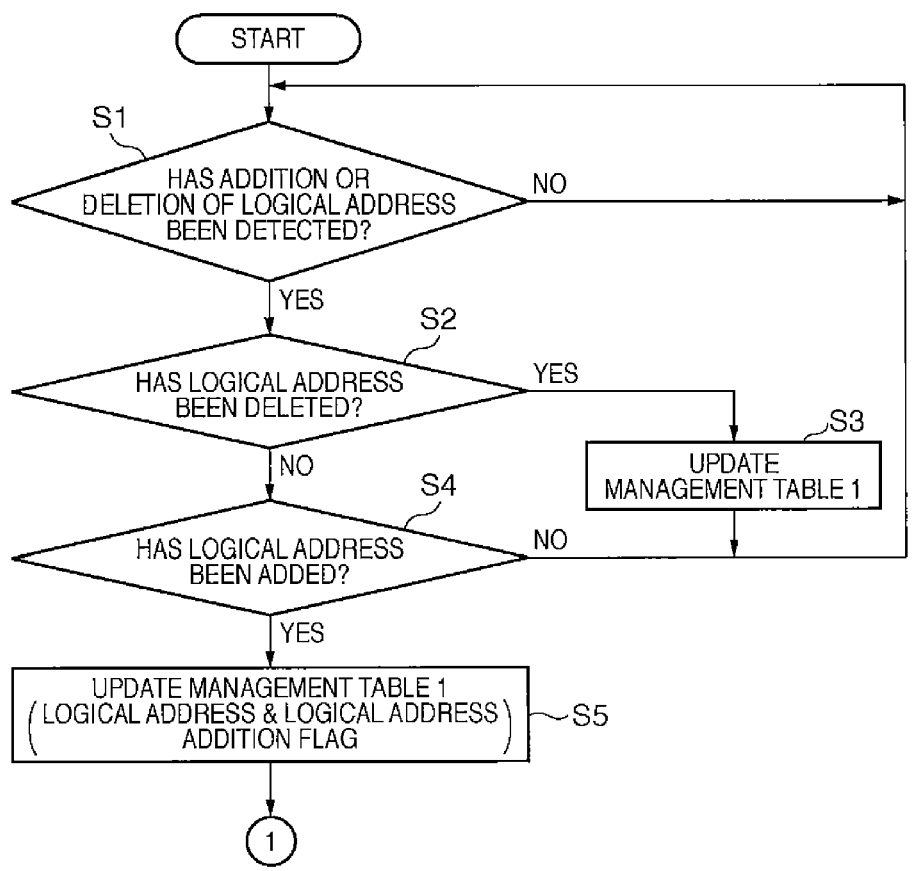

Next, a process for causing a transmitting apparatus to obtain an address performed by the receiving apparatus 100 according to the first embodiment will be described with reference to FIGS. 6A and 6B. Unless otherwise stated, the process of each step of the flowcharts of FIGS. 6A and 6B are implemented by a control program stored in a ROM (not shown) executed by the CEC control unit 116 (this applies to the other flowcharts described below).

In step S1, a Ping command is generated by the command generating unit 305 at a predetermined interval (e.g., every second) and output from the CEC transmitting unit 304 so that the Ping command is transmitted to a transmitting apparatus connected to the receiving apparatus 100. Ping commands are generated and transmitted in a number equal to the number of logical addresses whose connection needs to be checked. The logical address detecting unit 302 checks the voltage level of the ACK bit, which is the last bit, of a returned Ping command. If the voltage level is "High", it indicates that the transmitting apparatus having the logical address indicated by the Ping command is not connected. If the voltage level is "Low", it indicates that the transmitting apparatus having the logical address indicated by the Ping command is connected. In this manner, the logical address detecting unit 302 can detect connection (addition) and disconnection of the transmitting apparatuses 101 and 102 that have a CEC function. If the addition or deletion of a logical address (or in other words, the connection or disconnection of a transmitting apparatus) is detected, the process advances to step S2.

In the case of a logical address having been deleted, the process advances from step S2 to step S3, where the connected apparatus managing unit 306 deletes a row containing the deleted logical address from the Management Table 1 (see FIG. 3), and the process returns to step S1.

In the case of a logical address having been added, the process advances from step S2 through step S4 to step S5, where the connected apparatus managing unit 306 adds a row to the Management Table 1 for the added logical address. At this time, a value "Added" is input into the "Logical Address Addition Flag". Then, the process advances to step S6.

In step S6, the connected apparatus managing unit 306 detects the 5VPWR status of each of the HDMI ports 103 and 104 by using the 5VPWR detecting unit 114. If there is a change in the status, the connected apparatus managing unit 306 updates the "5VPWR Status" of the Management Table 2 (see FIG. 4). If 5VPWR is asserted (there is a change from "OFF" to "ON"), the connected apparatus managing unit 306 inputs a value "Added" into the "5VPWR Addition Flag" of the Management Table 2.

In step S7, the connected apparatus managing unit 306 determines whether or not there is an HDMI port that has the value "Added" in the "5VPWR Addition Flag" of the Management Table 2. As a result of the determination, if such a port is not found, the process advances to step S8, and if such a port is found, the process advances to step S11. When "Added" is written in the "5VPWR Addition Flag" of the Management Table 2, it means that the status signal input into the 5VPWR detecting unit 114 has been changed from "unable" to "able".

Meanwhile, when there is no change in the 5VPWR status despite the fact that a logical address has been added, it means that the power of the added transmitting apparatus is off and, thus, the transmitting apparatus cannot obtain authentication information and update the address. Accordingly, a process for turning on the power to a transmitting apparatus added in steps S8 to S10 as described below is performed. If, on the other hand, 5VPWR is asserted even when the power of an added transmitting apparatus is off, this transmitting apparatus can update the address, so the process advances to step S11 without turning on the power. Although not illustrated, the determination of step S7 and the processes performed thereafter are executed for each added logical address.

In step S8, the command generating unit 305 generates a Give_Device_Power_Status command (power-on command) and transmits the command to the transmitting apparatus that has the added logical address. The power status detecting unit 303 receives a Report_Power_Status command as a response to the Give_Device_Power_Status command, whereby the power status detecting unit 303 confirms the power status of this transmitting apparatus. If the power is on, the process returns to step S6 through step S9 (the Management Table 2 is updated in step S6, and the process advances from step S7 to step S11 next time). If the power is off, the process advances from step S9 to step S10.

In step S10, the command generating unit 305 generates and transmits a User_Control_Press (Power-On) command to the transmitting apparatus. At this time, for the logical address as the transmission destination of the User_Control_Press (Power-On) command, the connected apparatus managing unit 306 changes the value of the "Power-on Command Transmission Flag" of the Management Table 1 to "Transmitted". Then, the process returns to step S8, where the power status detecting unit 303 again confirms the power status of the transmitting apparatus.

In step S11, the connected apparatus managing unit 306 transmits an input switching request signal to the switching determination unit 401. The switching determination unit 401 transmits a switching request to the switching control unit 402. Upon receiving the switching request, the switching control unit 402 transmits a selector switching signal to the HDMI selector 107, whereby the HDMI port serving as an input source is switched to an HDMI port whose 5VPWR indicates "Added" (that is to say, an HDMI port whose status signal has been changed from "unable" to "able"). Also, the HPD control unit 115 activates the HPD signal of the selected HDMI port, whereby the transmitting apparatus connected to the selected HDMI port can perform HDCP authentication.

In step S12, the switching determination unit 401 transmits a timer start signal to the timer unit 400. Upon receiving the timer start signal, the timer unit 400 starts the timer.

In step S13, the physical address detecting unit 301 waits for the reception of a Report_Physical_Address command transmitted by the transmitting apparatus that has succeeded in updating its physical address, or for the timer unit 400 to time out. In the case of receiving a Report_Physical_Address command, for the logical address of the transmitting apparatus, the connected apparatus managing unit 306 stores the address indicated by the command in the "Physical Address" of the Management Table 1, and changes the value of the "Logical Address Addition Flag" to "Existing". Although not illustrated, in the case of the timer unit 400 timing out, the timer unit 400 notifies the CEC control unit 116 of the time-out.

In step S14, the connected apparatus managing unit 306 transmits a timer clear signal to the timer unit 400, and the timer unit 400 clears the timer.

In step S15, the connected apparatus managing unit 306 determines, for the logical address that corresponds to the physical address received in step S13, whether or not the value of the "Power-on Command Transmission Flag" of the Management Table 1 is "Transmitted". If the value is "Transmitted", the process advances to step S16. Otherwise, the process advances to step S17.

In step S16, the command generating unit 305 generates and transmits a Standby command (power-off command) to the logical address confirmed in step S15, thereby turning off the power of the transmitting apparatus. That is to say, the transmitting apparatus whose power was turned on by a CEC command is turned off after the above process has been performed.

In step S17, the command generating unit 305 changes the value of the "5VPWR Addition Flag" of the Management Table 2 to "Existing" for the selected HDMI port.

Through the above process, the added transmitting apparatus can obtain a correct physical address.

As described above, according to the present invention, when an added transmitting apparatus cannot update an address, the receiving apparatus 100 turns on the power to the transmitting apparatus and causes the transmitting apparatus to update the address.

This makes it possible to reduce the possibility that a transmitting apparatus connected to the receiving apparatus stores an incorrect address.

Second Embodiment

Figure 7:
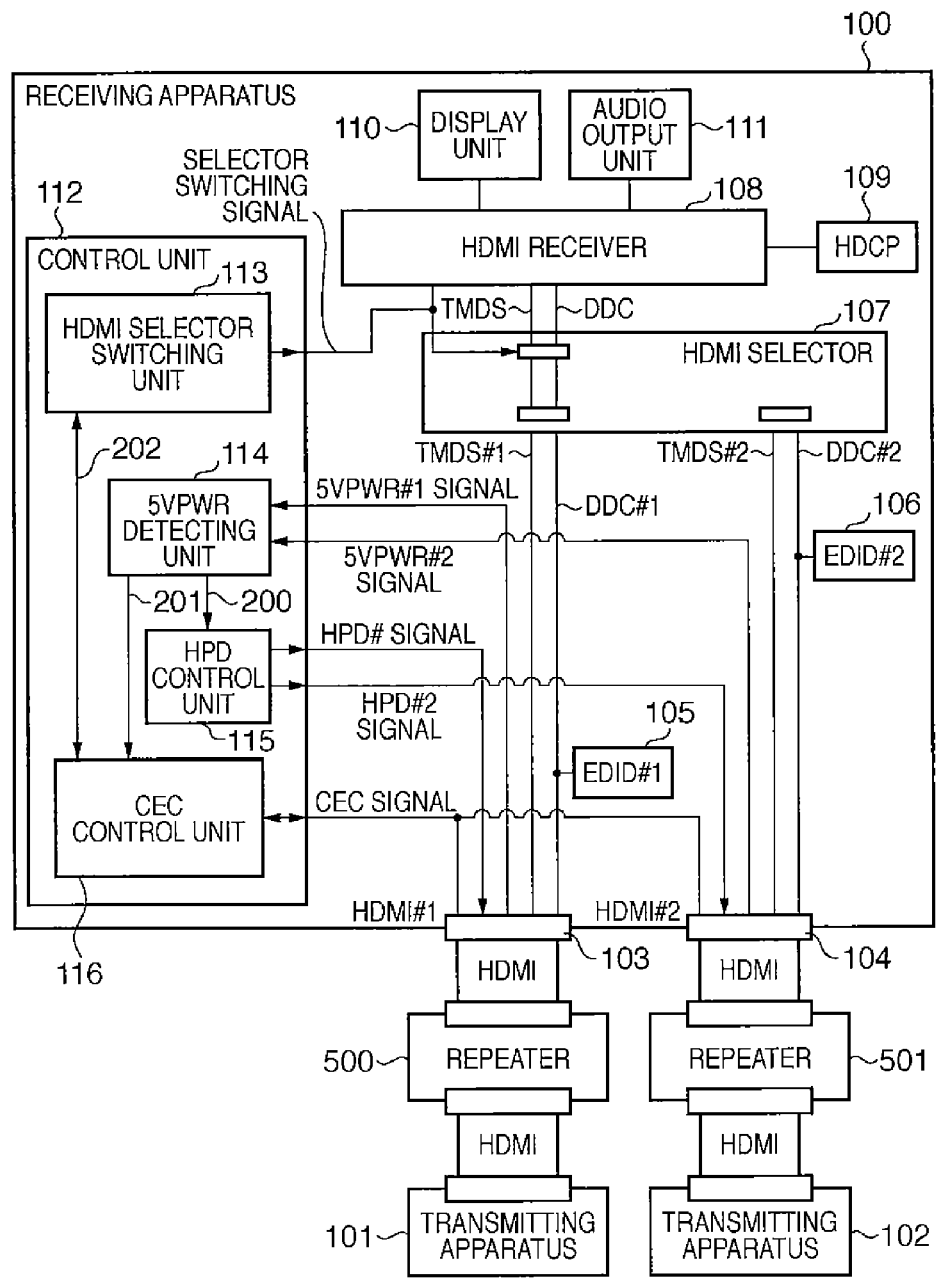
FIG. 7 is a block diagram showing a configuration of a receiving apparatus 100 according to a second embodiment.

The first embodiment has been described in the context of the transmitting apparatuses 101 and 102 directly connected to the HDMI ports 103 and 104, respectively. However, a situation as shown in FIG. 7 can arise in which repeaters 500 and 501, such as AV amplifiers, are interposed between the receiving apparatus 100 and the transmitting apparatuses 101 and 102 (or a situation in which a plurality of transmitting apparatuses are connected to a single HDMI port via a repeater). That is to say, transmitting apparatuses can be connected to the HDMI ports 103 and 104 directly or via a repeater. Alternatively, the configuration may be such that a plurality of transmitting apparatuses are connected to a single repeater. In FIG. 7, the same reference numerals are given to the same components as those of the first embodiment (see FIG. 1), and a description thereof is omitted here.

In this case, the receiving apparatus 100 cannot detect the 5VPWR status of the transmitting apparatuses 101 and 102. To address this, in the second embodiment, as shown in FIG. 8, a parameter, "Number of Added Apparatuses+1", is added to the Management Table 1. This parameter indicates a value obtained by adding 1 to the number of logical addresses added (that is to say, newly connected transmitting apparatuses).

A process for causing a transmitting apparatus to obtain an address performed by the receiving apparatus 100 according to the second embodiment will be described with reference to FIGS. 9A and 9B. In FIGS. 9A and 9B, the same reference numerals are given to the same steps as those of the first embodiment (see FIGS. 6A and 6B), and a description thereof is omitted here.

In step S100, the connected apparatus managing unit 306 saves a value obtained by adding 1 to the number of transmitting apparatuses added (this value is set to N) into "Number of Added Apparatuses +1" of the Management Table 1.

In step S101, the command generating unit 305 generates and transmits a Give_Device_Power_Status command to a transmitting apparatus (including the repeater) that has the value "Existing" in the "Logical Address Addition Flag" of the Management Table 1, whereby the power status detecting unit 303 confirms the power status of the existing transmitting apparatus. As used herein, a transmitting apparatus that has the value "Existing" in the "Logical Address Addition Flag" refers to a transmitting apparatus that has been connected before an added transmitting apparatus is detected.

In step S102, the command generating unit 305 generates and transmits a User_Control_Press (Power-On) command to a transmitting apparatus whose power is off. Then, the value of the "Power-on Command Transmission Flag" of the Management Table 1 is changed to "Transmitted".

If "Yes" is determined in step S7, the process from step S11 to step S14 can cause a repeater connected directly to the receiving apparatus 100 to update an address. Unlike the first embodiment, in the second embodiment, the process advances from step S14 to step S17 and returns to step S6.

If "No" is determined in step S7, through the process of steps S103 and S104 and the process from step S12 to step S14 interposed between steps S103 and S104, all HDMI ports are selected one after another by the HDMI selector 107, whereby the transmitting apparatus whose power was turned on in step S102 can update an address.

In step S105, the CEC control unit 116 reduces the value of N by a decrement of one.

In step S106, the CEC control unit 116 determines whether or not N=0. If N=0, the process advances to step S107. Otherwise, the process advances to step S8.

In the case of the process advancing from step S106 to step S8, through the process from step S8 to step S10, power to the added transmitting apparatus is turned on, and the process returns from step S9 to step S6. However, because the added transmitting apparatus is connected via a repeater, the 5VPWR status does not change even after turning on power to the added transmitting apparatus. Accordingly, the process advances from step S7 to step S103 again. All HDMI ports are selected one after another through the process of steps S103 and S104 and the process from step S12 to step S14 interposed between steps S103 and S104, whereby the added transmitting apparatus can update an address. Although not illustrated, when performing the process of the loop between steps S103 and S104 for the second time and any time after the second, if the physical address detecting unit 301 receives a Report_Physical_Address command in step S13, the process may jump from step S14 to step S105.

In step S107, the command generating unit 305 generates and transmits a Standby command to the logical address of each of the transmitting apparatuses whose power was turned on in step S102 or S10, thereby turning off the power of the transmitting apparatus.

Through the above process, a transmitting apparatus connected to the receiving apparatus via a repeater can update its address as well.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-270290, filed on Oct. 20, 2008 which is hereby incorporated by reference herein in its entirety.

What is claimed is:

1. A receiving apparatus comprising:
a first connection unit that is connectable to a first transmitting apparatus;
a second connection unit that is connectable to a second transmitting apparatus;
a storing unit that stores predetermined information;
a receiving unit that receives data from one of the first transmitting apparatus and the second transmitting apparatus if the first transmitting apparatus is connected to the first connection unit and the second transmitting apparatus is connected to the second connection unit; and
a control unit that (a) detects whether the first transmitting apparatus is connected to the first connection unit, (b) detects whether the second transmitting apparatus is connected to the second connection unit, (c) detects whether the first transmitting apparatus is in a first state that the first transmitting apparatus is able to obtain the predetermined information if the first transmitting apparatus is connected to the first connection unit, (d) performs a first process for causing the first transmitting apparatus to obtain the predetermined information if the first transmitting apparatus is in the first state while the first transmitting apparatus is connected to the first connection unit, and (e) performs a second process for controlling a power source of the first transmitting apparatus to change the first transmitting apparatus to the first state if the first transmitting apparatus is in a second state that is different from the first state while the first transmitting apparatus is connected to the first connection unit.

2. The receiving apparatus according to claim 1, wherein the control unit detects whether the first transmitting apparatus is changed to the first state after the power source of the first transmitting apparatus is controlled.

3. The receiving apparatus according to claim 1, wherein the second process includes a process for turning on the power source of the first transmitting apparatus.

4. The receiving apparatus according to claim 1, wherein the first process includes a process for activates activating a HPD (Hot Plug Detect) signal relating to the first transmitting apparatus.

5. The receiving apparatus according to claim 1, wherein the predetermined information is used for causing the receiving apparatus to receive at least one of video data and audio data.

6. The receiving apparatus according to claim 1, wherein the predetermined information is used for selecting the first transmitting apparatus as an input of the receiving apparatus.

7. The receiving apparatus according to claim 1, wherein the receiving apparatus is able to perform a communication by CEC (Consumer Electronics Control).

8. A method for controlling a receiving apparatus including a storing unit that stores predetermined information comprising:
receiving data from one of a first transmitting apparatus and a second transmitting apparatus if the first transmitting apparatus is connected to a first connection unit that is connectable to the first transmitting apparatus and the second transmitting apparatus is connected to a second connection unit that is connectable to the second transmitting apparatus;
detecting whether the first transmitting apparatus is connected to the first connection unit;
detecting whether the second transmitting apparatus is connected to the second connection unit;
detecting whether the first transmitting apparatus is in a first state that the first transmitting apparatus is able to obtain the identification information if the first transmitting apparatus is connected to the first connection unit;
performing a first process for causing the first transmitting apparatus to obtain the predetermined information if the first transmitting is in the first state while the first transmitting apparatus is connected to the first connection unit; and
performing a second process for controlling a power source of the first transmitting apparatus to change the first transmitting apparatus to the first state if the first transmitting apparatus is in a second state that is different from the first state while the first transmitting apparatus is connected to the first connection unit.

9. The method according to claim 8, further comprising detecting whether the first transmitting apparatus is changed to the first state after the power source of the first transmitting apparatus is controlled.

10. The method according to claim 8, wherein the second process includes a process for turning on the power source of the first transmitting apparatus.

11. The method according to claim 8, wherein the first process includes a process for activating a HPD (Hot Plug Detect) signal relating to the first transmitting apparatus.

12. The method according to claim 8, wherein the predetermined information is used for causing the receiving apparatus to receive at least one of video data and audio data.

13. The method according to claim 8, wherein the predetermined information is used for selecting the first transmitting apparatus as an input of the receiving apparatus.

14. A non-transitory computer-readable recording medium storing a program, wherein the program causes a computer to perform a method for controlling a receiving apparatus, wherein the receiving apparatus includes a storing unit that stores predetermined information, the method comprising:
receiving data from one of a first transmitting apparatus and a second transmitting apparatus if the first transmitting apparatus is connected to a first connection unit that is connectable to the first transmitting apparatus and the second transmitting apparatus is connected to a second connection unit that is connectable to the second transmitting apparatus;
detecting whether the first transmitting apparatus is connected to the first connection unit;
detecting whether the second transmitting apparatus is connected to the second connection unit;
detecting whether the first transmitting apparatus is in a first state that the first transmitting apparatus is able to obtain the identification information if the first transmitting apparatus is connected to the first connection unit;
performing a first process for causing the first transmitting apparatus to obtain the predetermined information if the first transmitting is in the first state while the first transmitting apparatus is connected to the first connection unit; and
performing a second process for controlling a power source of the first transmitting apparatus to change the first transmitting apparatus to the first state if the first transmitting apparatus is in a second state that is different from the first state while the first transmitting apparatus is connected to the first connection unit.

15. The receiving apparatus according to claim 1, wherein the control unit performs a process for restoring the power source of the first transmitting apparatus after the first process and the second process are performed.

16. The receiving apparatus according to claim 1, wherein the control unit performs a process for turning off the power source of the first transmitting apparatus after the first process and the second process are performed.

17. The method according to claim 8, further comprising performing a process for restoring the power source of the first transmitting apparatus after the first process and the second process are performed.

18. The method according to claim 8, further comprising performing a process for turning off the power source of the first transmitting apparatus after the first process and the second process are performed.

* * * * *